July 18, 1950 K. M. MACK ET AL 2,516,009

CONVERTER SYSTEM

Filed Oct. 28, 1948

WITNESSES:
Robert C. Baird
Wm. C. Groome

INVENTORS
Kent M. Mack &
Coleman J. Miller.
BY F. E. Browder
ATTORNEY

Patented July 18, 1950 2,516,009

UNITED STATES PATENT OFFICE 2,516,009

CONVERTER SYSTEM

Kent M. Mack, Baltimore, and Coleman J. Miller, Catonsville, Md., assignors to Westinghouse Electric Corporation, East Pittsburgh, Pa., a corporation of Pennsylvania Application October 28, 1948, Serial No. 57,016

6 Claims. (Cl. 250—9)

Figures 1, 2:
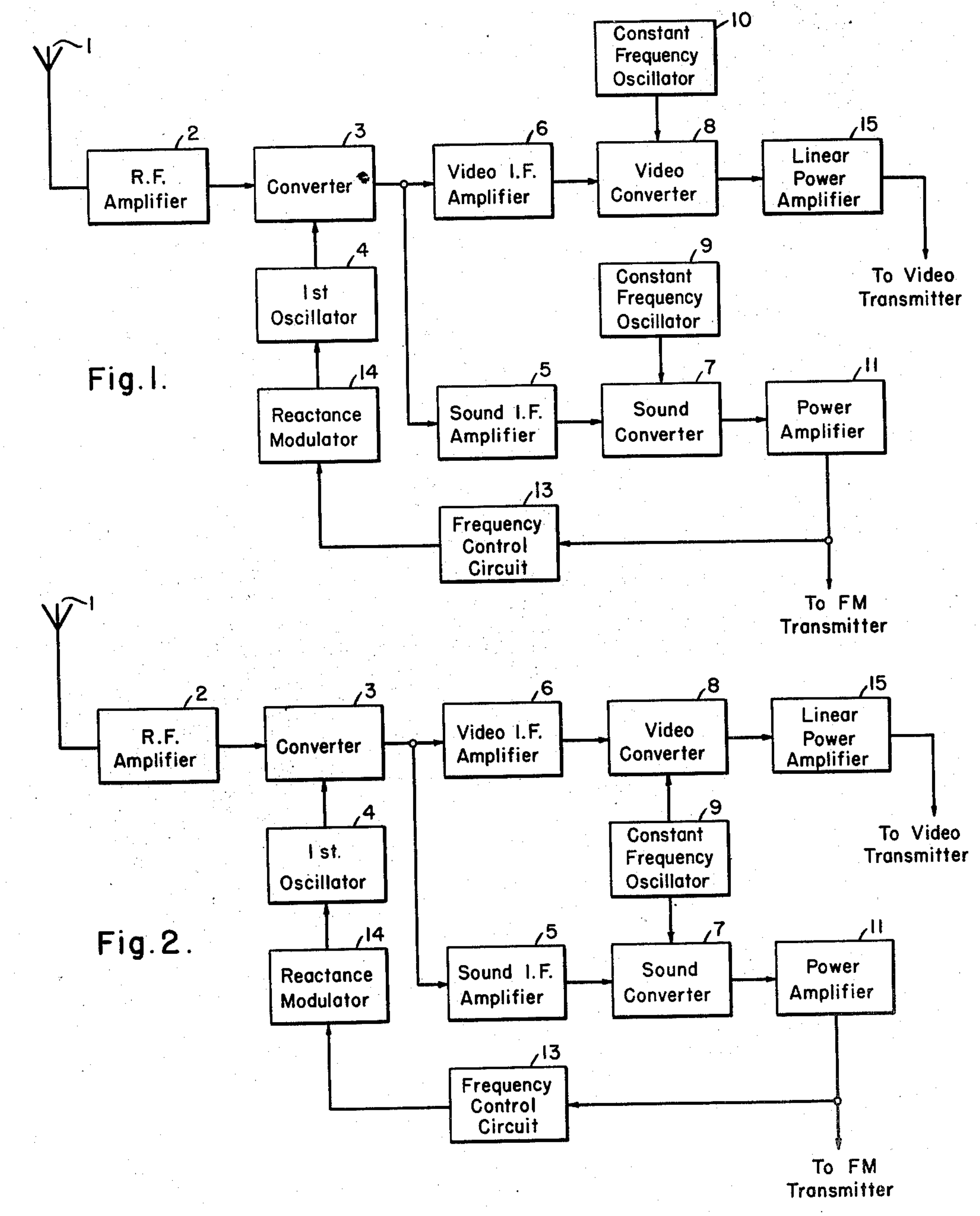

This invention relates to radio relaying systems and it has particular reference to airborne facilities for relaying television signals.

The frequencies of the channels allotted to television and frequency modulation signalling have line of sight characteristics. Therefore a distribution system for adequate population service necessitates an economically non-feasible number of relay points unless the relay points are elevated to a very great height.

Copending applications Serial No. 609,669 and Serial No. 742,654, both of which are assigned to Westinghouse Electric Corporation, disclose systems for distributing high frequency signals by airborne radio stations. In accordance with these disclosures, airborne radio stations are provided with means for receiving, amplifying and retransmitting a plurality of signal channels.

Economical feasibility of the airborne radio station requires that the station be provided with a plurality of signal channels. Each channel is required to completely process its respective signal so that the signal is amplified and reradiated on a selected frequency without distortion fidelity deterioration, or frequency drift. Complete components for achieving these ends for each signal entails a considerable accumulation of apparatus with attendant span and weight requirements.

The multiplication of equipment units due to complete complements of apparatus for each channel aggravates the maintenance requirements thereby resulting in the need for a plurality of technicians. Each technician adds a weight movement to the aircraft load which is seriously detrimental to the economic feasibility of the project.

It has been found that the problem of limiting weight in an airborne station, particularly when flight is to be sustained for lengthy durations assumes extreme importance.

The problem is further complicated by the fact that each television channel comprises a video signal and an audio signal. The video signal is amplitude modulated and the audio signal is frequency modulated.

It follows that if the conventional method of demodulating, amplifying at low frequency level, and modulating the reradiated energy is employed that two diverse complements of apparatus is required for each television signal. Each complement of apparatus must include frequency stabilizing devices to insure that rebroadcasts will be maintained on specified frequencies.

Another objection to the conventional method of demodulating, amplifying and again modulating is the detrimental effect of electrical noises in and about the airborne station.

The noise effects arise largely from the fact that the required alternating power is generated at a relatively high power frequency such as 400 to 800 cycles per second for the reason that the higher the alternating power frequency the less the iron, and therefore the weight that is required in transformers, chokes, etc. These power frequencies are within the audio range and the prevention of spurious injection of the same in apparatus working at audio frequencies is very difficult and expensive.

It follows therefore that it is important in an airborne radio station to achieve the relay and broadcast processes without operations on the signals in the audio range.

It is therefore an object of the present invention to reduce the amount of equipment in a television relay system.

It is another object of my invention to provide a television relay system in which the output frequencies are closely maintained on the selected value.

Still another object is to provide a television signal relay system in which operations in the audio frequencies are avoided.

The foregoing objects are accomplished by a method and apparatus the nature of which will become apparent from the following detailed description accompanied by the drawing in which Figure 1 is a schematic showing of one embodiment and Figure 2 is a schematic showing of a modification thereof.

Referring to Figure 1, an incoming television signal is intercepted by broad pass antenna 1. Both video and audio signals are amplified in radio frequency amplifier 2. The amplified signals are then impressed on heterodyne converter 3. Also impressed on the heterodyne converter is the output of a first heterodyne oscillator 4. The heterodyning oscillator energy is mixed with the video and audio signals in the converted and the difference frequencies are selected and impressed on the intermediate frequency amplifiers.

The intermediate frequency signals are separated by a frequency difference equivalent to the difference between the video and audio frequencies of the original signals received. This difference is commonly 4.5 megacycles although it can be other selected values.

The video intermediate frequency amplifier is therefore tuned to a frequency which is separated from the frequency to which the audio intermediate frequency channel is tuned by a constant amount.

In order that the amplification of each signal will be obtained without distortion due to frequency departures in the signals with respect to the band-pass of the respective intermediate frequency amplifiers means must be provided for the automatic stabilization of the frequency of the oscillator energy which feeds into the first converter.

It follows that since the sound and video signals applied to the converter have a fixed frequency separation, and also since the respective intermediate frequency channels are tuned to frequencies having the same selected frequency separation, that if one of the intermediate frequency signals is maintained on frequency by control of the first local oscillator, the other intermediate frequency will also be maintained on the proper frequency.

To this end I use the sound intermediate frequency carrier as a control signal.

The sound carrier is selectively channeled into the sound intermediate frequency amplifier 5. In this amplifier the signal is amplified and then passes into second converter 7. The signal having been amplified at a practical low frequency is mixed with the output of constant frequency oscillator 9 and the sum frequency is selected by power amplifier 11. The frequency of the oscillator 9 is so selected that the sum of the oscillator and signal frequencies is the high frequency signal to be reradiated. The oscillator 9 may be a crystal oscillator or any other constant frequency oscillator.

A portion of the signal in the output of the power amplifier 11 is diverted into a frequency control circuit 13. This circuit generates a control voltage having a magnitude and polarity corresponding to the amount and direction of frequency shift of the signal output in the sound channel from the desired output frequency. The control voltage so generated is applied to reactance modulator 14 which acts in conjunction with first oscillator 4 to restore the output frequency to the proper value in the usual manner.

The video signal is processed in video amplifier 6, mixed in converter 8 with the output of constant frequency oscillator 10 and the sum frequency amplified in power amplifier 15. The frequency at which oscillator 10 operates is a choice determined by the selected output video frequency. The oscillator 10 may be a crystal oscillator or any other constant frequency oscillator.

The single frequency stabilizer in the sound channel operates to maintain the output video signal as well as the output sound signal on frequency. In this connection, it is desired that the crystal controlled second oscillator either have negligible drift or have equal drifts in the same direction. The latter choice requires less expensive equipment and avoids the weight involved in apparatus for maintaining constant crystal temperatures.

The equipment needed to process each television signal can be simplified still further if the frequency separation between sound and video signals reradiated need not be different from the separation as received. Referring to Figure 2, the circuit arrangements for the video and sound channels are the same as for Figure 1 except that only one second oscillator 9 is provided and the output energy of this oscillator is injected in both the sound and video second converters. In this case, the single frequency control circuit insures the maintenance of both sound and video output signals on the selected frequency and also maintains the frequency separation of the video and sound output signals the same as the separation of the signals as received.

Although the invention herein described has particular advantages for use in an airborne radio station, its use is not limited to such.

Another desirable use for the arrangement is in television broadcast apparatus even though located on the ground.

Although the invention has been described with reference to certain specific embodiments, other modifications are possible. Therefore, the invention is to be restricted only by the appended claims, as interpreted in view of the prior art.

We claim as our invention:

1. A radio relay station for relaying a television signal including a video modulated carrier and a sound modulated carrier each separated from the other by a fixed frequency comprising a broad-pass input circuit capable of passing both said carriers, a single source of high frequency energy, a broad-pass frequency converter capable of accepting both said carriers and said high frequency energy, and of converting the frequency of said carriers to intermediate frequency signals, a first channel having an intermediate frequency amplifier for the video intermediate frequency signal and a channel having an intermediate frequency amplifier for the sound intermediate frequency signal, a second converter in each of said channels and means for injecting high frequency energy in each of the second converters, a power amplifier in each channel for passing the sum frequencies in each channel, and means coupled to the output of one of said power amplifiers for generating a potential having an amplitude and polarity depending on departures in frequency of the signal in the said one power amplifier from the selected output frequency, and means responsive to said potential for controlling the frequency of the said single source of high frequency energy to thereby stabilize the output frequency of both said power amplifiers.

2. A multi-signal radio relay station for relaying a prescribed number of radio signals comprising a broad-pass input circuit and a broad-pass frequency converter coupled to said input circuit, a single source of high frequency energy coupled to said input circuit, an intermediate frequency amplifier for the heterodyned frequency of each of said radio signals coupled to said frequency converter, second converter means coupled to each said intermediate frequency amplifier, means for injecting high frequency energy in each second converter, and a power amplifier coupled to the output of each converter, means for generating a frequency control potential coupled to one of said power amplifiers, and means for impressing said potential on said source of high frequency energy to control the same and thereby stabilize the frequency of the output signal from the power amplifiers.

3. In a radio relay system for receiving and transmitting the bands of frequencies included in a television video and sound signals, a station having a broad-pass input, a broad-pass first converter and a first local oscillator, a pair of intermediate frequency amplifiers having a band-pass corresponding to the heterodyne difference frequency between the local oscillator and the video and sound frequencies respectively, a second converter coupled to each intermediate frequency amplifier and a second source of highly stable in frequency energy coupled to each of said second converters; a separate amplifier tuned to the sum frequency coupled to the output of each of the respective converters, and means coupled to one of said amplifiers for generating a potential having a polarity and magnitude corresponding to departures of the sum frequency, of the converter connected to said amplifier, from the frequency to which said amplifier is tuned, and means for impressing said potential on the first local oscillator to thereby control the frequency of the same.

4. In a radio relay system, a station for receiving a plurality of signals having constant frequency separations and for transmitting said signals comprising a first source of high frequency energy, means for heterodyning said first source of high frequency energy with each of said signals, individual amplifiers for the difference frequency between each of said signals and the first source of high frequency energy, second converter means coupled to the output of each of said amplifiers and to a second source of high frequency energy, frequency selective means tuned to the respective sum frequencies coupled to the output of each of said second converter means, and means responsive to a departure of one of the respective sum frequencies from the selected frequency for generating a potential having a direction and magnitude corresponding to the direction and magnitude of said departure, means for impressing said potential on the said first source of high frequency energy to control the frequency thereof to maintain all the respective sum output frequencies on the selected value.

5. In a radio relay system for receiving and transmitting the bands of frequencies included in a television video and sound signals, a station having a broad pass input, a broad pass first converter and a first source of high frequency energy, a pair of intermediate frequency amplifiers having a band pass corresponding to the heterodyne difference between said first source of high frequency energy and said video and sound frequencies respectively, a second converter coupled to each intermediate amplifier, separate second source of highly stable in frequency energy coupled to each of said second converters, frequency selective means tuned to the respective sum frequencies coupled to the output of each of said second converters, means responsive to a departure of one of the respective sum frequencies from the selective frequency for generating a potential having a direction and magnitude corresponding to the direction and magnitude of said departure, and means for impressing said potential on said first source of high frequency energy to maintain all the respective sum output frequencies on the selected value.

6. The relay system of claim 5 in which the second sources of highly stable in frequency energy have limited frequency drift in substantially equal amounts in the same direction.

KENT M. MACK.
COLEMAN J. MILLER.

REFERENCES CITED

The following references are of record in the file of this patent:

UNITED STATES PATENTS

| Number | Name | Date |
|---|---|---|
| 2,155,821 | Goldsmith | Apr. 25, 1939 |
| 2,164,032 | Day | June 27, 1939 |
| 2,270,652 | Espley | Jan. 20, 1942 |
| 2,406,932 | Tunick | Sept. 3, 1946 |
| 2,407,212 | Tunick | Sept. 3, 1946 |